M. WILSON.
NONGLARE RAIN SHIELD PLATE AND METHOD OF MAKING THE SAME.
APPLICATION FILED AUG. 20, 1920.
1,437,580. Patented Dec. 5, 1922.
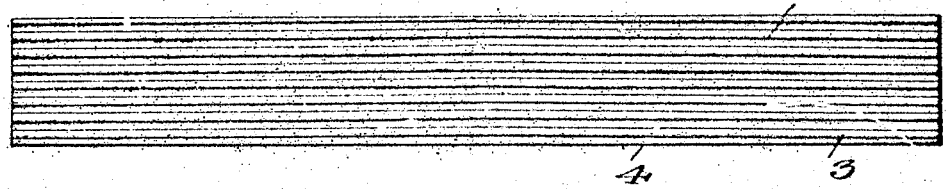
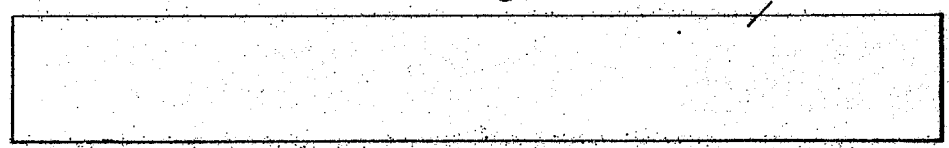
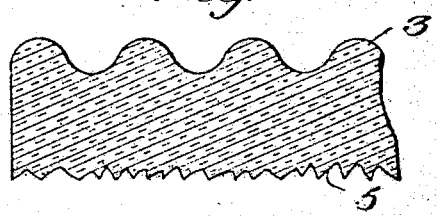
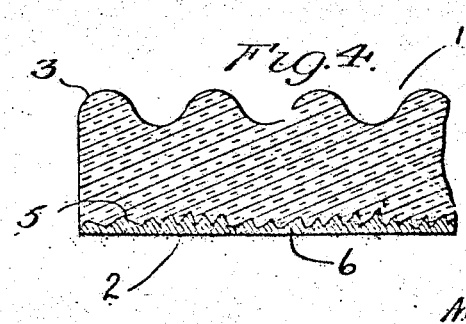
Morris Wilson
INVENTOR
by Victor J. Evans
ATTORNEY Patented Dec. 5, 1922.

1,437,580

UNITED STATES PATENT OFFICE.

MORRIS WILSON, OF CHICAGO, ILLINOIS, ASSIGNOR TO B. B. HANAK COMPANY, OF CHICAGO, ILLINOIS, A CORPORATION OF ILLINOIS.

NONGLARE RAIN-SHIELD PLATE AND METHOD OF MAKING THE SAME.

Application filed August 20, 1920. Serial No. 404,737.

*To all whom it may concern:*

Be it known that I, MORRIS WILSON, a citizen of the United States, residing at Chicago, in the county of Cook and State of Illinois, have invented new and useful Improvements in Nonglare Rain-Shield Plates and Methods of Making the Same, of which the following is a specification.

This invention relates to a non-glare rain shield plate and to the method for manufacturing same and has for its primary object the construction of a rain shield that is positively non-glaring and which is colored in such a manner that the coloring material is permanent.

An object of the invention is the novel manner of arranging the projections or corrugations on the surface of the plate so that there will be an interference between the light rays and besides collected water will be drained in a direction to drop from the ends of the plate instead of the longitudinal lower edge thereof.

A feature of the invention is the inexpensive method of making the glass plate nonreflecting and which will give color rays that are very restful to the eyes.

With these and other objects in view the invention will be better understood from the following detailed description taken in connection with the accompanying drawing wherein:

Fig. 1 is a view looking at the top surface of the plate.

Fig. 2 is a view looking at the under surface of the plate.

Fig. 3 is an enlarged sectional view before the coating of coloring material is applied.

Fig. 4 is a similar view with the coating applied.

Again referring to the drawing illustrating one construction of my invention the numeral 1 designates the top surface of the plate or a vizor while the numeral 2 designates the under surface.

At the start I wish to call attention to the fact that the following description will not be limited to a method for forming a rain shield plate for automobiles but I wish it to be understood that the method may be used in various other arts to color glass with a permanent coloring material.

The top surface is formed with a series of corrugations or projections to cause the rays of the incident light striking the glass to reflect in a direction to cause an interference between the rays of reflection. By arranging the corrugations 3 as illustrated in the drawing an additional advantage is accomplished inasmuch as water collecting on the plate will be conveyed towards the ends of the plate where the same may be drained from the plate instead of collecting on the longitudinal edge 4 of the plate and then dripping which interferes with the clear vision of the operator of the automobile.

To color the glass in a manner to absorb any light rays trying to pass through the glass plate or to color the same the glass is colored in a manner that the color material is fixed and, therefore, cannot be removed. One of my many methods is to subject the under surface to the action of a blast of coarse sand until a relatively large number of irregularly shaped indentations are formed and then increasing the number of indentations and the depth thereof by subjecting the under surface to a final action of a blast of fine sand so that, theoretically speaking, the under surface is shaped as shown at 5 Fig. 3. The next step is to apply a coating of coloring material 6 to the under surface of the proper consistency to readily flow into and become lodged in the indentations with the result that the coating cannot be rubbed from the surface and to completely remove the coloring material it is necessary to wear the surface to the glass the depth of the indentations.

One manner of forming this coating and applying same is to mix a quantity of coloring mineral, and varnish to the proper consistency to enter the indentations, and it is very advantageous to apply this mixture in the form of a spray so that the particles of liquid may be driven into the indentations.

It is, of course, to be understood that there are various other mixtures that may be used for coloring purpose, and the liquid may be applied in various other manners and besides the plate may be roughened or formed with indentations in various other manners and, therefore, I do not desire to be limited in any manner except as set forth in the claims hereunto appended.

Having thus described my invention what I claim is:

1. A non-glare rain shield plate having one side roughened and its other side impregnated with a coloring material.

2. A non-glare rain shield plate constructed of glass having one side formed with a series of projections to cause an interference between the light rays striking the plate, and a layer of coloring material upon the other side of the glass having portions embedded between said projections.

3. A non-glare rain shield plate having its upper surface corrugated in a direction to shed water towards the ends of the plate, and a coloring material applied to the under surface of the plate.

4. A non-glare rain shield plate having its upper surface shaped to form an interference between the light rays striking the same, and its under surface roughened, and a coating of colored material applied to the roughened surface.

5. A non-glare rain shield plate having its upper surface corrugated and its under surface acted upon to provide numerous irregularly shaped indentations, and a coating of coloring material filling the indentations.

6. A method of forming a non-glare glass plate, consisting in shaping one side of the plate to cause interference between the light rays striking thereon, subjecting the other side to the action of a sand blast and then filling the indentations caused by the sand blast with a coloring material.

7. A method of forming a non-glare plate which consists in shaping the top surface of the plate to form a series of interfering light reflecting surfaces, subjecting the under surface of the plate, first to a coarse sand blast and then to a fine sand blast, and applying a coating of coloring material to the under surface.

8. A method of forming a non-glare plate which consists in shaping the top surface of the plate to form a series of interfering light reflecting surfaces, subjecting the under surface of the plate, first to a coarse sand blast and then to a fine sand blast, and applying a coating of coloring material to the under surface consisting of a mineral and a liquid of proper viscosity to freely flow into the indentations formed by the sand blasts.

9. A method of forming a non-glare plate which consists in shaping the top surface of the plate to form a series of interfering light reflecting surfaces, subjecting the under surface of the plate, first to a coarse sand blast and then a fine sand blast and applying a coating of coloring material to the under surface consisting of a mixture of a mineral, varnish and turpentine of the proper consistency to be readily sprayed into the indentations formed by the sand blasts.

In testimony whereof I affix my signature.

MORRIS WILSON.